No. 627,236. Patented June 20, 1899.
C. H. OAKLEY.
LATHE ATTACHMENT FOR CUTTING RUBBER OR OTHER RINGS.
(Application filed Apr. 3, 1897.)
(No Model.) 2 Sheets—Sheet 1.
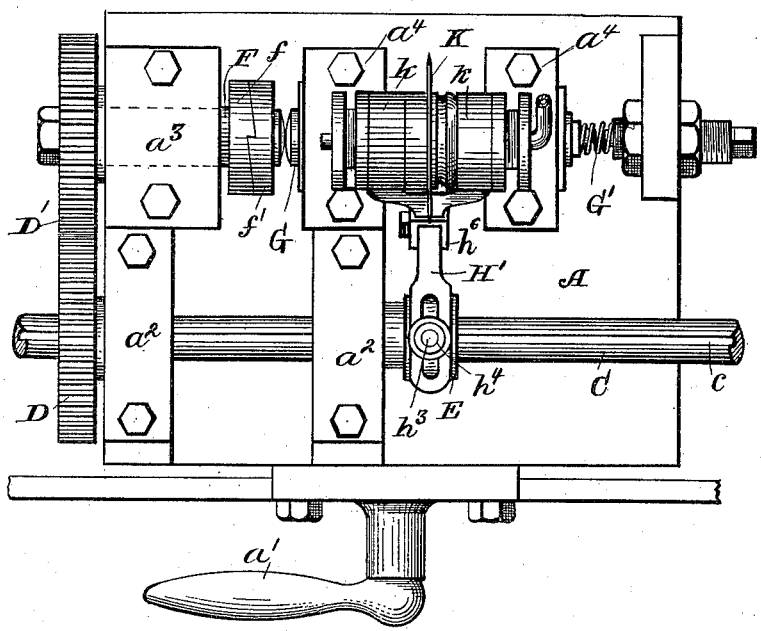
FIG. I.
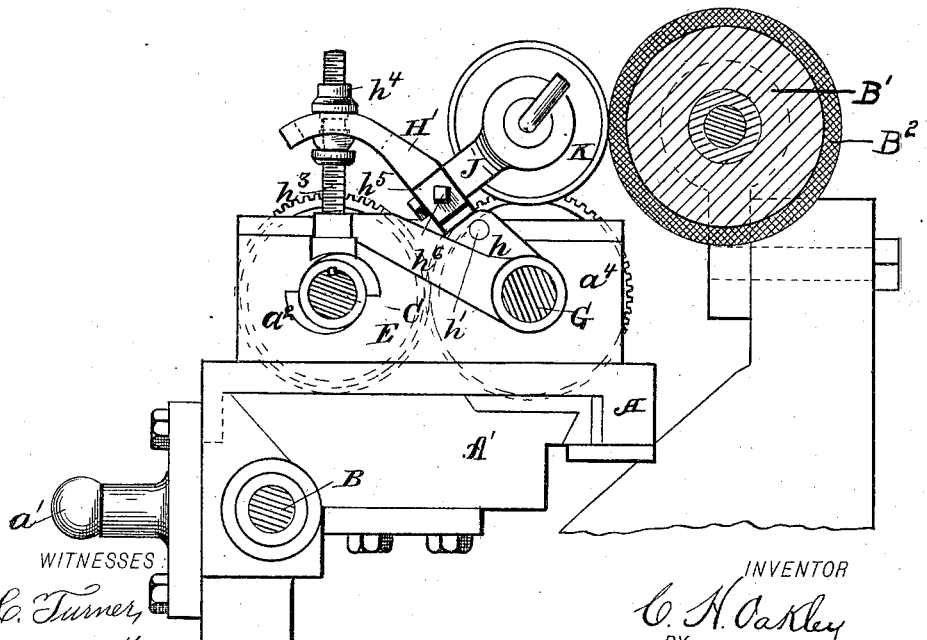
FIG. II.
WITNESSES
INVENTOR
C. H. Oakley
BY
Hall & Fay
ATTORNEYS No. 627,236. Patented June 20, 1899.
C. H. OAKLEY.
LATHE ATTACHMENT FOR CUTTING RUBBER OR OTHER RINGS.
(Application filed Apr. 3, 1897.)
(No Model.) 2 Sheets—Sheet 2.
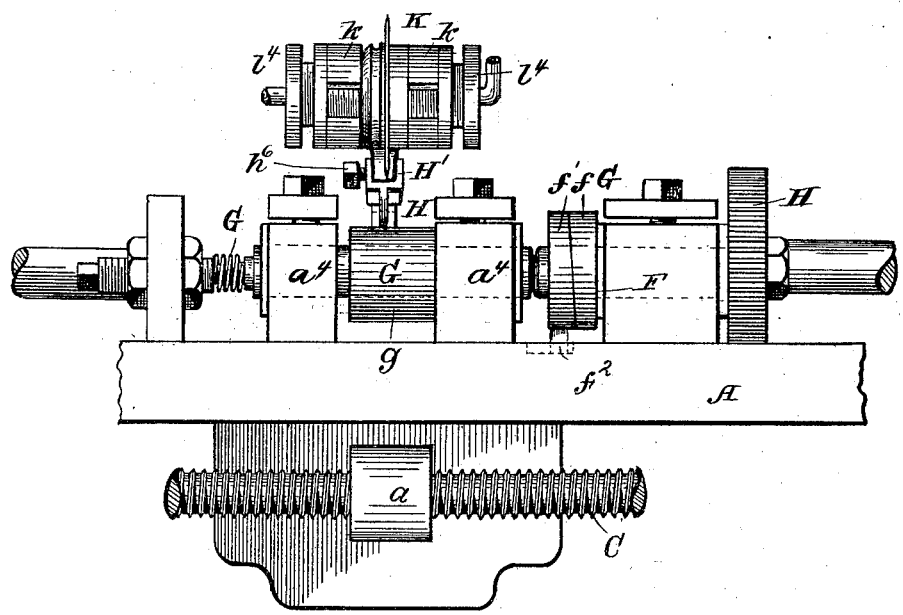
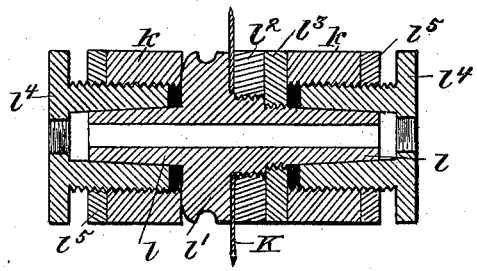
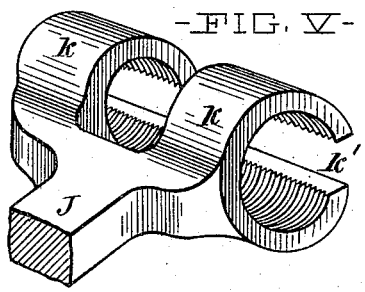 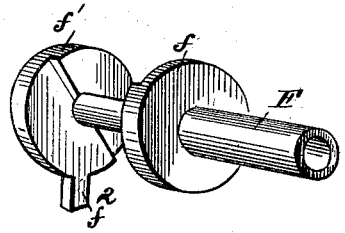
WITNESSES: INVENTOR
C. H. Oakley
BY
Hall & Fay
ATTORNEYS.

UNITED STATES PATENT OFFICE.

CLIFFORD H. OAKLEY, OF CLEVELAND, OHIO.

LATHE ATTACHMENT FOR CUTTING RUBBER OR OTHER RINGS.

SPECIFICATION forming part of Letters Patent No. 627,236, dated June 20, 1899.

Application filed April 3, 1897. Serial No. 630,599. (No model.)

*To all whom it may concern:*

Be it known that I, CLIFFORD H. OAKLEY, a citizen of the United States, and a resident of Cleveland, county of Cuyahoga, and State of Ohio, have invented a certain new and useful Improvement in Lathe Attachments for Cutting Rubber or other Rings, of which the following is a specification, the principle of the invention being herein explained and the best mode in which I have contemplated applying that principle so as to distinguish it from other inventions.

The annexed drawings and the following description set forth in detail certain mechanism embodying the invention, such disclosed means constituting but one of various mechanical forms in which the principle of the invention may be used.

The object of my invention is to perfect mechanism adapted to automatically cut annular rings from hollow cylindrical material, especially rubber, and to provide a cutter which will require a minimum of attention and renewal and also make a sharp clean cut without leaving ridges at the edges of the rings and adapt said mechanism to be attached to lathes.

In the said annexed drawings, Figure I represents a top plan of my improved attachment mounted upon a carriage. Fig. II represents an end elevation of same, showing also a part of the lathe-frame and showing the rubber tube mounted on a mandrel. Fig. III represents a rear elevation of the attachment. Figs. IV and V represent detail views of the cutter, its bearing, and bearing-sleeve; and Fig. VI is a perspective view of both the small cams used.

The carriage A is arranged to slide upon runways A' on the frame of the lathe and is driven by a screw B, as in an ordinary machine-lathe. Suitable clamp-nuts $a$ and a hand-crank $a'$ are provided and arranged in the well-known manner to throw the carriage in and out of gear. A shaft C, formed with a longitudinal groove $c$, passes through suitable bearings $a^2$ on the carriage. Mounted upon the said shaft and attached to the carriage is the gear D, which is provided with a feather fitting into the groove $c$, whereby the said gear is caused to rotate with the said shaft and to slide upon it. On the other side of the carriage is mounted in a similar manner the double cam E. The gear and cam then always retain their position relative to the carriage—that is, they travel along with it.

The gear D meshes with a second gear D' of same size as D, mounted upon a hollow shaft F, journaled in a bearing $a^3$ upon the carriage. Upon the opposite end of the said shaft F is rigidly fixed a cam $f$, having upon its outer face two helical surfaces, each extending over half the face and each ending in an abrupt fall, which ends in the beginning of the other helix, as is shown in Fig. VI. A second cam $f'$ fits upon the face of the cam $f$ and is formed with a spindle which fits loosely in the hollow of the shaft F and is provided with a small lug $f^2$, which engages the carriage-body and prevents its rotation, but permits of its longitudinal reciprocation. The outer face of said cam $f'$ abuts the end of a reciprocating shaft G, which is kept in constant contact with said cam by a spring G', mounted upon its opposite end. The said shaft is journaled in suitable bearings $a^4$ upon the carriage. The portion $g$ of the shaft between the two bearings $a^4$ is enlarged and of not quite the width between said bearings, which discrepancy allows of the reciprocation of the said portion between said bearings. The said shaft G has formed integral with it on the enlarged portion $g$ the arm H, whose extremity rests continuously upon the cam E. A lug $h$, formed on the upper side of the arm H, near the portion $g$ of the shaft, is slotted and receives the extremity of an auxiliary arm H', which is journaled upon a pin $h'$, seated in the said lug, and passes through the slot therein. The arm H' may by this arrangement be oscillated on the pin $h'$.

The free end of the auxiliary arm H' is arranged to be located immediately above the end of the arm H and is formed with a vertical bore, through which freely passes a screw $h^3$, provided on each side of the arm with a nut $h^4$, by means of which nut the longitudinal position of the screw may be fixed or altered relatively to the arm H'. The lower extremity of the screw rests upon the end of the arm H, and it is readily seen that by altering the length of the portion of the screw projecting below the end of arm H' the angularity of the latter may be altered and adjusted. By so adjusting the angularity of the said arm the position of the cutter-holder J and its cutter K, which are secured to it in a manner hereinafter described, is also adjusted—that is, by such adjustment the depth to which the cutter K penetrates the material $B^2$ is determined.

The cutter-holder J fits into a socket $h^5$, formed in the arm H', and is held by means of a set-screw $h^6$. The said holder is formed at its end with a double socket $k$, having a slot $k'$ cut its entire length to admit the conical spindle $l$ of the cutter K. The said spindle is formed with a shoulder $l'$, against which the cutter K is placed, and nuts $l^2$ and $l^3$ screw up against it to hold it in place. Conical bearing-nuts $l^4$ form the bearings and are screwed into the outer ends of the sockets $k$ and locked by means of lock-nuts $l^5$.

The mechanism operates as follows: The carriage travels along its bed at the required speed, the shaft C being driven at the same time and rotating the cam E and the gears D and D', the mandrel B' and the tube $B^2$ being driven at a high speed on the lathe-centers in front of the cutter. The cam E reciprocates the arm H twice in every revolution, thus feeding the cutter into the rubber tube. The cutter on coming into contact with the revolving tube is also rapidly revolved while performing its function. The shaft G meanwhile is also moved in the direction of the travel of the carriage and twice for every revolution of the same shaft. The fall in the cams $f$ and $f'$ is made equal to the distance traveled by the carriage in one-half a revolution of the shaft C, and the cams are so arranged that the fall takes place the instant the arm H is in its lowermost position. It is seen then that the arm H, and consequently the cutter K, is held stationary with respect to the material operated upon while the cutter is cutting, and when the cutter is withdrawn it is moved by the spring G' to recover its lost ground, and the cutter is again fed into the material.

The cutter being circular is worn equally upon all portions of its periphery, and in consequence of its being revolved only by the material with which it comes in contact there can be no tearing of the knife through the material, the cutting being produced by pressure alone. The cut is in consequence a perfectly clean and smooth one and is entirely devoid of ridges or rough edges. The use of my rotary cutter also does away with frequent sharpening or grinding, which is required when stationary knives are used. It is also readily seen that the speed of revolution of the cylinder of material may be varied with impunity and a perfect cut produced, especially when the material is rubber, which cannot be cut at a low speed by a stationary knife without dragging of the knife and tearing of the material.

The use of a circular cutter is also advantageous in that it does not destroy the wooden mandrels upon which the rubber cylinder is supported with such great rapidity as do stationary knives.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In a lathe attachment, the combination of a rotary cutter adapted to be rotated by the material to be cut, an arm upon which the cutter is mounted, mechanism for reciprocating said arm to advance and retract the cutter with relation to the work, means for advancing said arm longitudinally along said work, means for periodically retarding the movement of the cutter-arm, and means for returning the cutter to its original longitudinal position, substantially as set forth.

2. In a lathe attachment, the combination with a rotary cutter adapted to be rotated by the material to be cut, of an arm upon which the cutter is mounted, means for reciprocating said arm to advance and retract the cutter, cam mechanism for periodically arresting the movement of the cutter-supporting arm, a shaft upon which the cutter-arm is mounted, and means for reciprocating said shaft longitudinally to return the cutter to its first position.

3. In a lathe attachment, the combination of a rotary cutter adapted to be rotated by the material to be cut, and mounted upon an arm, means for moving said arm to and from the work, said arm being secured to a shaft supported in bearings upon a carriage, means for advancing said carriage, mechanism for periodically moving said shaft in the opposite direction at a speed equal to that of the advance of the carriage and means for returning said shaft to its first position.

4. In a lathe attachment, the combination of a rotary cutter adapted to be rotated by the material to be cut, and mounted upon an adjustable arm, cam mechanism for moving said arm to and from the work, a shaft to which said arm is secured, said shaft resting in bearings upon a carriage, screw mechanism for advancing said carriage along the work, cam mechanism for moving said shaft in the opposite direction of the movement of the carriage and spring mechanism for returning the shaft.

5. In a lathe attachment, the combination with the carriage and means for moving it, of a rotary cutter adapted to be rotated by the material to be cut, an arm upon which the cutter is mounted, a shaft upon which said arm is secured, means for reciprocating said arm comprising a rotary shaft and cam, means for retarding the movement of said arm comprising opposing cams one of which rotates while the other is held against rotation but is capable of reciprocation, and a spring-controlled shaft.

Signed by me this 15th day of March, 1897.

CLIFFORD H. OAKLEY.

Attest:
 A. E. MERKEL,
 DAVID T. DAVIES.